US008832775B2

(12) United States Patent
Brown et al.

(10) Patent No.: US 8,832,775 B2
(45) Date of Patent: Sep. 9, 2014

(54) TECHNIQUES FOR WORKLOAD SPAWNING

(75) Inventors: Jeremy Ray Brown, Orem, UT (US);
Jason Allen Sabin, Lehi, UT (US);
Lloyd Leon Burch, Payson, UT (US);
Michael John Jorgensen, Mapleton, UT (US)

(73) Assignee: Novell, Inc., Provo, UT (US)

( * ) Notice: Subject to any disclaimer, the term of this patent is extended or adjusted under 35 U.S.C. 154(b) by 559 days.

(21) Appl. No.: 13/162,672

(22) Filed: Jun. 17, 2011

(65) Prior Publication Data

US 2012/0324527 A1    Dec. 20, 2012

(51) Int. Cl.
*G06F 21/00*    (2013.01)

(52) U.S. Cl.
USPC ............... 726/1; 713/1; 717/174; 717/176

(58) Field of Classification Search
None
See application file for complete search history.

(56) References Cited

U.S. PATENT DOCUMENTS

| 5,293,282 | A | * | 3/1994 | Squires et al. | 360/77.08 |
| 7,092,946 | B2 | | 8/2006 | Bodnar | |
| 2002/0108012 | A1 | * | 8/2002 | Olarig et al. | 710/306 |
| 2005/0114862 | A1 | * | 5/2005 | Bisdikian et al. | 718/105 |
| 2006/0253472 | A1 | | 11/2006 | Wasserman et al. | |
| 2009/0276771 | A1 | * | 11/2009 | Nickolov et al. | 717/177 |
| 2011/0055034 | A1 | * | 3/2011 | Ferris et al. | 705/26.1 |
| 2011/0093862 | A1 | | 4/2011 | Doatmas et al. | |
| 2011/0125894 | A1 | | 5/2011 | Anderson et al. | |
| 2011/0126047 | A1 | * | 5/2011 | Anderson et al. | 714/15 |

* cited by examiner

*Primary Examiner* — Jung Kim
*Assistant Examiner* — Tri Tran
(74) *Attorney, Agent, or Firm* — Schwegman, Lundberg & Woessner P.A.

(57) ABSTRACT

Techniques for spawning workloads are provided. A single repository is read once to obtain an image for a workload or files and resources for the image. The read operation spawns multiple, and in some cases, concurrent write operations, to instantiate the workload over a network as multiple occurrences or instances of the workload in multiple processing environments.

20 Claims, 4 Drawing Sheets

TECHNIQUES FOR WORKLOAD SPAWNING

BACKGROUND

Cloud computing is rapidly changing the Internet into a collection of clouds, which provide a variety of computing resources, storage resources, and, in the future, a variety of resources that are currently unimagined.

This new level of virtualization should have unbounded the physical and geographical limitations of traditional computing, but this is not yet the case largely in part because of current deficiencies managing and instantiating virtualized resources over a network. That is, enterprises have been reluctant to outsource resources to cloud environments because the level-of-effort required for migration remains fairly expensive.

For example, the difficulty associated with managing resources by creating and deleting a lot of resources at one time adds a problem that has not been addressed in the industry. For example, consider a situation where an administrator knows that a resource running Apache™ Hadoop™ XEN (Virtual Machine (VM) Monitor (VMM)) and other scalable services are not performing as they should be, and the administrator needs to provision another 50 resources to handle the increased capacity. The likely only technique in place for the administrator within the enterprise is one that manually clones each one of the needed resources individually and cannot take advantage of the native hardware features available in the underlying architecture, which may assist in making the work more efficient.

In fact, current cloning techniques cause a bottleneck at an enterprise's resource deployment facility. This same bottleneck problem occurs when an administrator needs to de-provision resources that are running. The issue also arises across many other problems sets associated with distributing and creating processes intelligently across a network.

So, if an enterprise needs to get a large number of resources into an enterprise system as quickly as possible, the traditional cloning technology uses a one-to-one cloning approach, which is very slow, largely manual, and inefficient.

Furthermore as resources are moved to cloud environments, new processes are often and regularly started and stopped as needed. In many situations, the number of processes that are started and stopped can be in the range of 10 s, 100 s, or even 1000 s at a time. Current architecture arrangements and methodologies do not efficiently allow this to happen without also having to incur large overhead expenses during the process.

SUMMARY

Various embodiments of the invention provide techniques for workload spawning. Specifically, a method for workload spawning is presented.

A workload is configured with a deployment policy, an identity-based authentication mechanism, and an access-control mechanism. A first instance of the workload is deployed in a first processing environment utilizing the deployment policy, the identity-based authentication mechanism, and the access-control mechanism. The deployment policy is updated to reflect an occurrence of the first instance and the deployment of additional instances of the workload occurs to additional processing environments using and updating the deployment policy for each additional occurrence of the workload and enforcing the identity-based authentication mechanism and the access-control mechanism.

DETAILED DESCRIPTION

Figure 1:
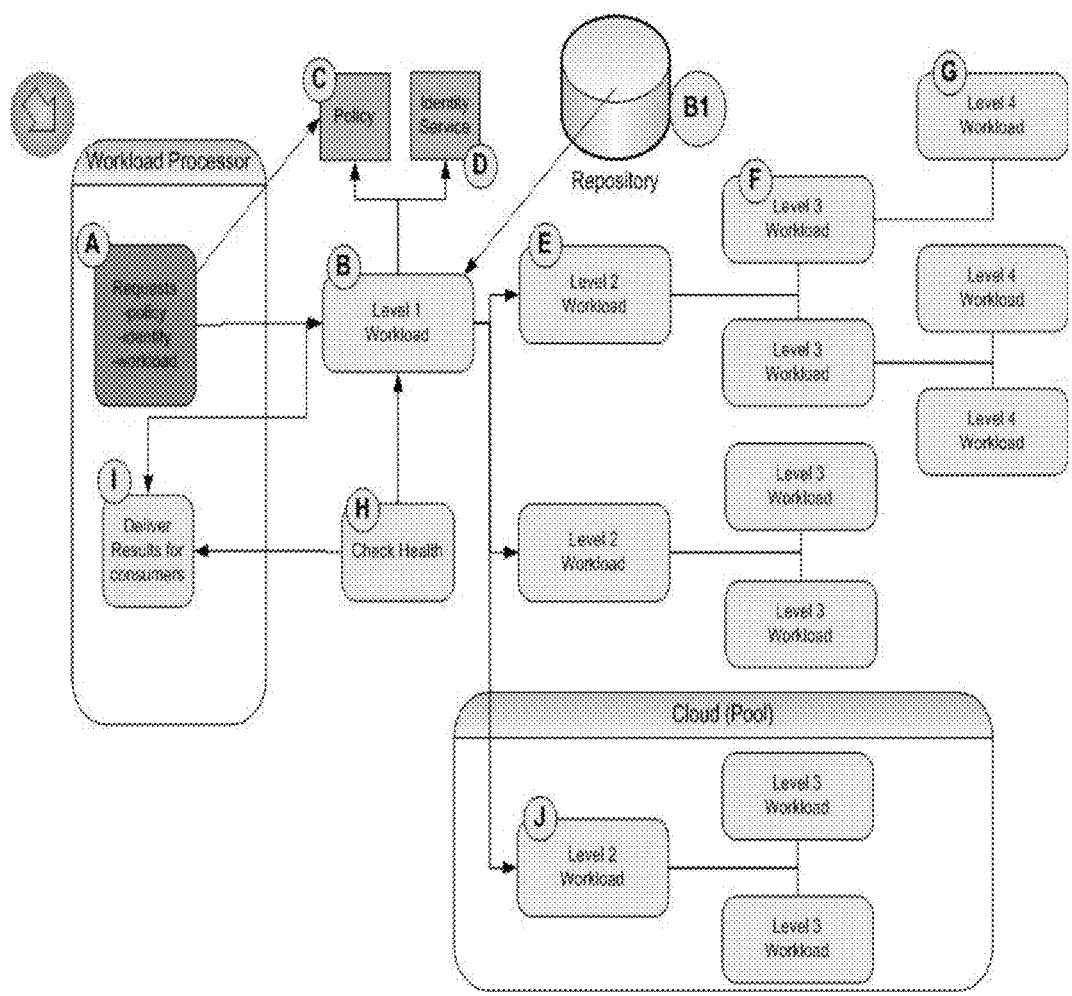
FIG. 1 is a diagram of an example architecture for workload spawning, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "workload" as used herein refers to a special type of resource, such as a Virtual Machine (VM), an Operating System (OS), a hardware device, an agent, and/or an application.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

FIG. 1 is a diagram of an example architecture for workload spawning, according to the techniques presented herein. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured to execute the components.

The FIG. 1 is presented with reference to a variety of specific example situations that an enterprise utilizing cloud environments can encounter. These are presented for purposes of illustration only as other situations can occur as well and still benefit from the techniques presented herein and below.

At A (in the FIG. 1), the user (can be any type of principal (automated application, etc.)) originates a request against the system to create 13 (as one example) new workload/images to help handle the traffic in a web server cluster. The request starts in the processor and creates a single workload that can validate identity and provide policy to manage techniques presented herein.

At B, where the first workload is generated the content is bootstrapped. (Covered in more detail below with the processing discussed at B-1.) The workload is created; internal to the workload is an embedded process that includes identity validation that can create workloads. Also, it includes the policy to tell how to create workloads and instantiate those workloads. In the present example, a most effective algorithm with recursion is used to let the system interact and optimize how the images are created. There is also a way for using a single workload to instantiate all the other workloads as an alternative. One essential point is that there is spawning from the workloads themselves for purposes of fulfilling a request based upon dynamically evaluated policy parameters.

At B-1, this is the location of the files (repository) that are used in the workload. The technique is that the files are used via a single read operation from the location with multiple writes to the different locations to create multiple workload instances. This approach can be used with multiple existing or emerging technologies or used with a multicast that is pushed down to the machines and initiated. There are a few options when the workload data is deployed using an image, files, or combination of both to deploy. The workload can be an image that mimics a Pre-boot eXecution Environment (PXE) boot and loads a virtual image, processes on the virtualization platform to load the workload, or lays down the files for the image. There are many options that can be used, but the embodiments herein discuss how to distribute a workload between environments and machines and then instantiate the workload instances. As described, there are many hardware technologies that can be leveraged with the embodiments presented herein, which aren't being utilized today. For instance, there is the ability to use the multiple heads on a hard drive or write to multiple sectors with a solid state drive while utilizing multicasting to drive the data. Current technology requires one to manually copy and write multiple times across the system, which interferes with the current running workloads on the system.

At C, there is presented a policy that allows for deciding how the workloads are generated across the system. The policy includes maximum values for the environment and the ability to work independent of location between the lab, datacenter, private cloud, public cloud, etc. A differentiator, with the approaches herein, is that work occurs across the entire landscape of a company or enterprise environment (physical, private clouds, public clouds, etc.).

At D, an identity service authorizes the actions of the techniques to provide access control for every workload being generated. The only workload communicating with the identity service is the first workload. The novelty to this approach is that the workloads are not independent and actually work together as a single unit. Moreover, the ability to separate from a tree organization of workloads is still achievable, if desired, but control for groups of workloads is also achievable.

Internal to the workload is a policy defining how many total workloads to generate and how many can be managed from a single workload. The policy is also able to tell me how many resources can be used between environments. As an example, consider an individual user's cloud that is limited to only three workloads, while a lab environment may have a limit of 100's of clouds. With the approaches herein one can determine where and also apply a priority to the decision. In the single user cloud example, there may be three children on the first level then two children below that level to get the total number of 13 workloads.

At E, Once the new workload in Level 2 is bootstrapped, identity information is obtained, at B and also the updated policy, at C, which now shows where 12 workloads reside now instead of 13 (at B one was created). There is also an option to wait until all the nodes are started before the files are pushed down or the files are immediately copied. There is still another option to have each workload contact the files individually or through the processing at B or Level 1. Once the workload is started then it spawns off the next series of workloads until either a specific total is reached or the directions are dynamically changed. Once the correct actions are finished, a message is sent back to the processing at B, which coordinates the activities.

At F, the same processing is followed as the processing at E: bootstrapping the workload, reading the policy, and completing the identity authorization. Once started, then two more workloads are spawned off following the policy acquisition. At G, is completion processing where there are no more nodes to spawn and so processing returns to B for purposes of completing the call. Notice that my tree is not exactly balanced because the speed of the hardware is leveraged to complete the calls as fast as possible. Furthermore, policy instructions can build the tree in any desired tree pattern, and other types of tree algorithms can be used, or an administrator can process the techniques at any desired optimized rate.

At H, the system is uniquely monitored. Packets are sent along the tree series to have messages delivered securely along the path built. Each node only knows about other nodes connected to it; this provides more security in that no machine has access to every other machine.

At J, the processing allows work to occur independent of the technology so that one can spawn to a public cloud or private cloud. This allows one to integrate and spawn workloads based upon the needs of the organization and independent of the technology being used by that organization. The same bootstrapping happens to the workload with execution of the policy/identity until the request is completed. The policy allows very fine grained control over the spawning along with the interaction that is happening between the workloads.

At I, the processing shows the final return to the workload processor to give confirmation that everything happened or that the current status as properly reported. The techniques herein can also utilize many calls for creating, managing, executing, and deleting the workloads within the enterprise or between enterprises.

Figure 2:
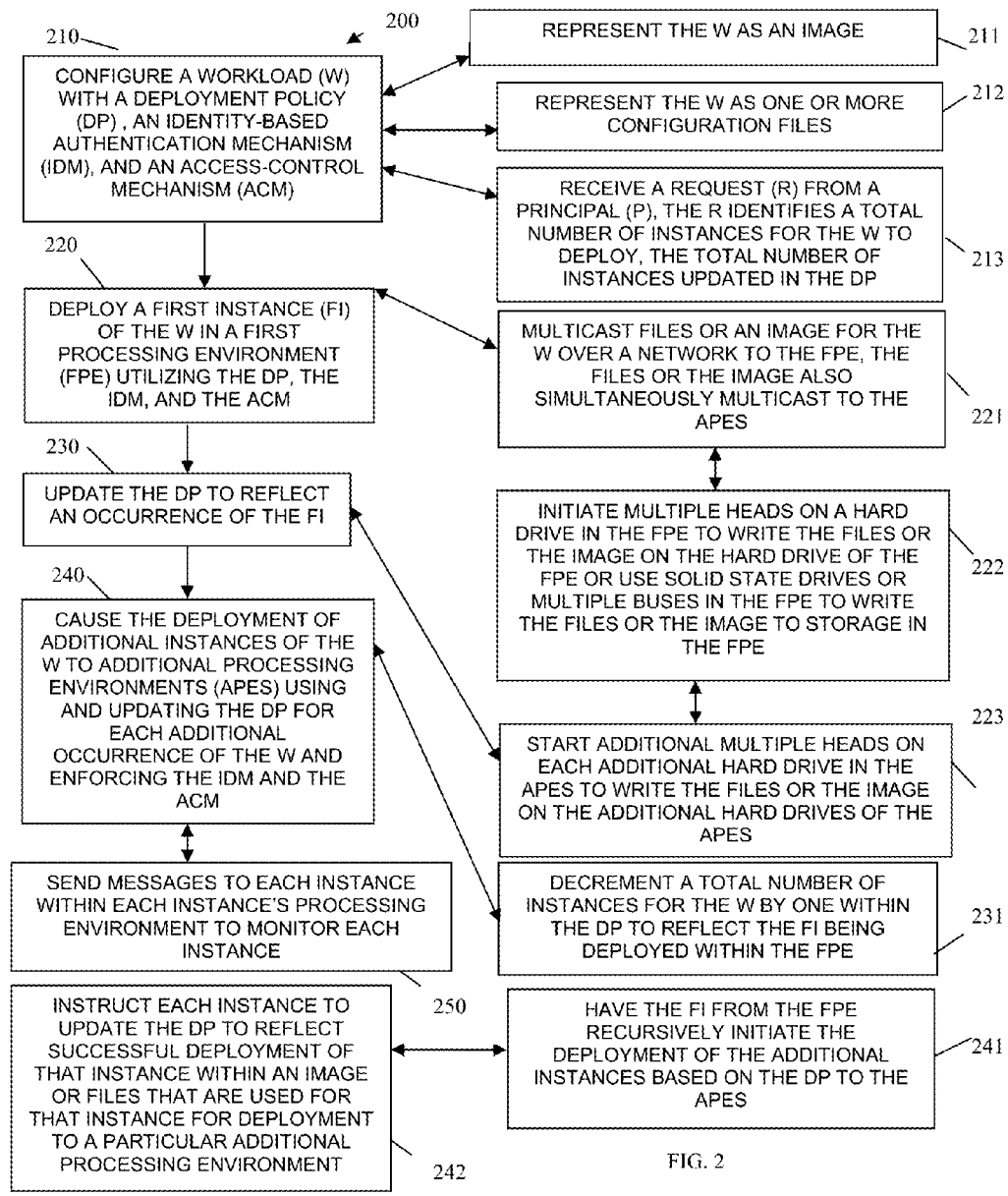
FIG. 2 is a diagram of a method for workload spawning, according to an example embodiment.

FIG. 2 is a diagram of a method 200 for spawning workloads, according to an example embodiment. The method 200 (hereinafter "workload distributor") is implemented and resides within a non-transitory computer-readable or processor-readable medium that executes on one or more processors of a network. Moreover, the workload distributor is operational over a network and the network may be wired, wireless, or a combination of wired and wireless.

At 210, the workload distributor configures a workload with a deployment policy, an identity-based authentication mechanism, and an access-control mechanism. The deployment policy drives how each instance of the workload is subsequently deployed and initiated in particular processing environments. The deployment policy can include a variety of information as discussed above and below. The identity-based authentication mechanism includes processing for authentication each instance of a workload with an authentication service, such as an identity service for purposes of acquiring a unique identity for each instance. The access-control mechanism includes processing for enforcing role-based and identity-based access to resources within or that access each instance of the workload.

An instance of the workload is a configured copy or duplicate of the workload that may include its own environmental specific configuration. Again, the workload can include such things as a VM, a system, an OS, a service, an application, or various combinations of these types of resources. So, a workload can be a single resource or a composite resource (that includes a variety of cooperating resources).

According to an embodiment, at 211, the workload distributor represents the workload as an imaged copy of the workload. This is what is loaded and installed by an OS and used to initiate an instance of the workload within any particular target processing environment.

In another case, at 212, the workload distributor represents the workload as one or more configuration files that identify resources of the workload, how to acquire, and how to configure and initiate instances of the workload using a multicast or broadcast protocol over a network from the remote repository to the first processing environment.

In yet another situation, at 213, the workload distributor receives a request from a principal (user or automated application). The request identifies a total number of instances for the workload to deploy over a network (can span multiple clouds). The total number of requested instances of the workload is updated to the deployment policy. As each instance of the workload is initiated it receives an updated total number of instances to ensure that the correct number of instances is being deployed over the network.

At 220, the workload distributor deploys a first instance of the workload in a first processing environment. Moreover, the first instance deployed within the first processing environment utilizes the deployment policy, the identity-based authentication mechanism, and the access-control mechanism.

In an embodiment, at 221, the workload distributor multicasts files or an image for the workload over a network to the first processing environment. The files or the image also simultaneously multicast or broadcasts to the additional processing environments (discussed at 240 below). In other words, the configuration information (image or files) is read once from a location accessible to the workload distributor and then multiple instances of the workload (including the first instance) are written and deployed to multiple processing environments. One technique for achieving this is to have the workload distributor multicast the image or files for the workload over a network to the multiple processing environments. Other approaches can be used as well, such as having each deployed instance push the next instance to deployment over the network (as discussed above and again below).

Continuing with the embodiment of 221 and at 222, the workload distributor initiates multiple heads on a hard drive in the first processing environment to write the files or the image on the hard drive of the first processing environment. The workload distributor can also initiate solid state drives or use of multiple buses in the first processing environment to write the files or the image to storage in the first processing environment. In fact, any hardware technology that optimizes storage writes in the first processing environment can be utilized for more efficient write performance. This permits a faster write with more efficient performance that utilizes aspects of the underlying hardware devices, which heretofore has not occurred.

Still continuing with the embodiment of 222 and at 223, the workload distributor starts additional multiple heads on each additional hard drive in the additional processing environments to write the files or the image on the additional hard drives of the additional processing environments. In other words, as each image is written to its processing environment (via the multicast from the source environment of the workload distributor), the write occurs utilizing multiple heads on the hard drives of each target processing environment. This results in efficient and quick deployment of the instances of the workload.

At 230, the workload distributor updates the deployment policy to reflect an occurrence of the first instance. In other words, the deployment policy (or perhaps other metadata associated with the workload) accounts for each instance being deployed, such that as each instance is initiated, each subsequent instance knows how many more instances are needed to fulfill a request for a specific number of instances being deployed on the network.

For example, at 231, the workload distributor decrements a total number of instances for the workload by one within the deployment policy to reflect that the first instance has been deployed already within the first processing environment. So, aspects of the deployment policy (or other metadata carried with each instance) serves as a counter that is decremented as each instance is successfully initiated in its particular target processing environment.

At 240, the workload distributor causes the deployment of additional instances of the workload to additional processing environments using and updating the deployment policy for each additional occurrence of the workload and enforcing the identity-based authentication mechanism and the access-control mechanism. That is, each instance of the workload deployed after the first instance spawns by itself as soon as the first instance is successfully deployed and as each spawned instance is deployed the deployment policy is updated for the next instance that is to spawn and the authentication and access mechanisms are enforced with each deployed instance.

According to an embodiment, at 241, the workload distributor has the first instance from the first processing environment recursively initiate the deployment of a next additional instance based on the updated deployment policy. Each deployed instance pushed deployment of the next instance in a recursive fashion.

Continuing with the embodiment of 241 and at 242, the workload distributor instructs each instance to update the deployment policy to reflect successful deployment of that instance within an image or files that are used for that instance for deployment to a particular additional processing environment. Here, the deployment policy is centrally managed and each instance updates the policy when that instance successfully initiates in its target processing environment.

In an embodiment, at 250, the workload distributor sends messages to each instance within each instances native processing environment for purposes of auditing and monitoring each instance. Monitoring and auditing policies can be enforced centrally via the workload distributor.

Figure 3:
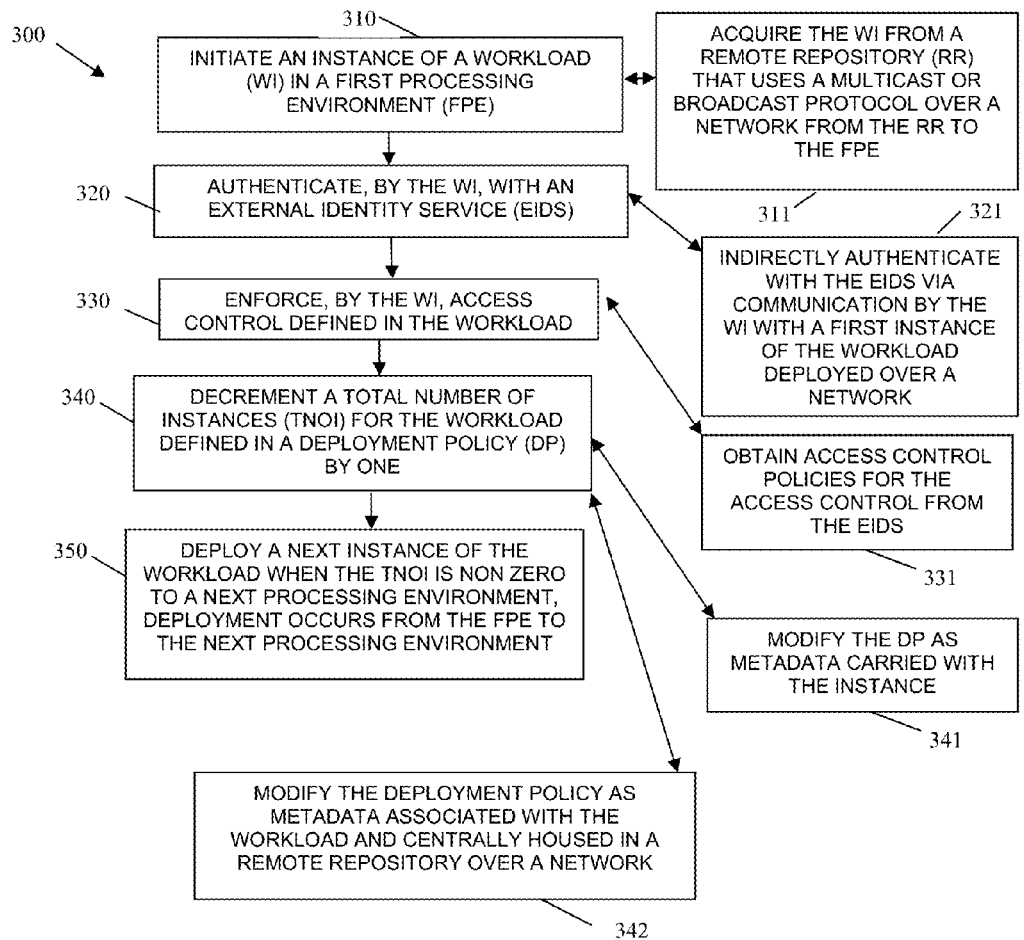
FIG. 3 is a diagram of another method for workload spawning, according to an example embodiment.

FIG. 3 is a diagram of another method 300 for spawning workloads, according to an example embodiment. The method 300 (hereinafter "workload instantiator") is implemented and resides within a non-transitory computer-readable or processor-readable medium that executes on one or more processors of a network. Moreover, the workload instantiator is operational over a network and the network may be wired, wireless, or a combination of wired and wireless.

The workload instantiator presents another and in some cases enhanced perspective of the workload distributor represented by the method 200 of the FIG. 2 and discussed in detail above. Specifically, the workload instantiator is presented from the perspective of a successfully installed instance of the workload whereas the method 200 is presented from the perspective of an initial deployment site for deployment of a first instance of the workload.

At 310, the workload instantiator initiates an instance of a workload in a first processing environment. In some cases, this can be the first processing environment for a first instance of the workload as discussed above with respect to the method 200 of the FIG. 2. Although, it is noted that the instance can be any instance in a chain of instances for the workload.

According to an embodiment, at 311, the workload instantiator acquires from the instance of the workload from a remote repository that uses a multicast or broadcast protocol or technology mechanism over a network from the remote repository to the first processing environment. In other words, the workload instantiator processes in the first processing environment and receives the workload for creating the instance as an image or files over the network via a multicast or even a broadcast communication from the remote repository.

At 320, the workload instantiator authenticates, via the instance now installed in the first processing environment, with an external identity service (external authentication mechanism, accessible over the network).

In an embodiment, at 321, the workload instantiator indirectly authenticates with the external identity service via communication with a first instance of the workload deployed over a network. In other words, the workload instantiator contacts the first installed network instance of the workload to authenticate with the external identity service, the first installed instance contacts the external identity service on behalf of the instance.

At 330, the workload instantiator enforces, via the instance of the workload, access control defined in the workload. That is, access control for resources accessing the instance or for internal resources of the instance obey access control defined for the workload.

In an embodiment, at 331, the workload instantiator obtains access control policies for the access control from the external identity service. So, access control policies can be dynamic and ever changing since authentication provides the access control policies dynamically to the instance.

At 340, the workload instantiator decrements a total number of instances for the workload defined in a deployment policy by one. When the instance is successfully up and running in the first processing environment, the number of deployed instances for the workload is updated so that each subsequent instance that is deployed knows how many more instances are needed based on the deployment policy.

According to an embodiment, at 341, the workload instantiator modifies the deployment policy as metadata carried with the instance. Here, a next installed instance of the workload uses the metadata that is modified when that particular instance is deployed in its target processing environment.

In another case, at 342, the workload instantiator modifies the deployment policy as metadata associated with the workload and centrally housed in a remote repository over a network. So, a central location manages the deployment policy; rather than the decentralized approach discussed at 341.

At 350, the workload instantiator deploys a next instance of the workload when the total number of deployed instances is non zero (greater than zero) to a next processing environment. Deployment occurs from the first processing environment to the next processing environment. So, each deployed instance causes or pushes the next deployed instance.

It is noted that a single processing environment can have multiple deployed instances.

Figure 4:
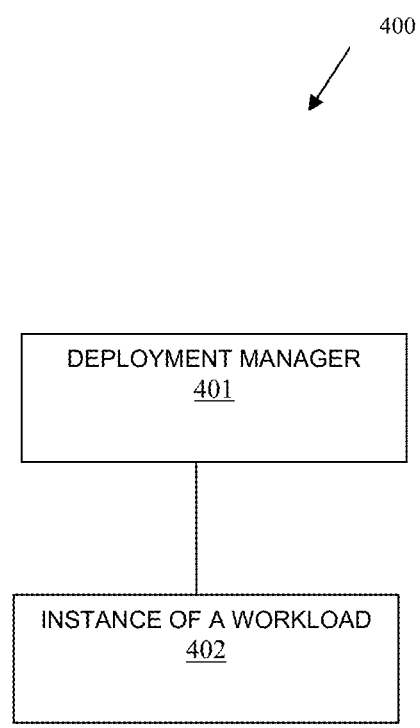
FIG. 4 is a diagram of a workload spawning system, according to the techniques presented herein.

FIG. 4 is a diagram of a workload spawning system 400, according to the techniques presented herein. The components of the workload spawning system 400 are implemented within and reside within a non-transitory and computer or processor-readable storage medium for purposes of executing on one or more processors of a network. The network may be wired, wireless, or a combination of wired and wireless.

The workload spawning system 400 implements, inter alia, various aspects of the FIG. 1, and the method 200 and the method 300 of the FIGS. 2 and 3, respectively.

The workload spawning system 400 includes a deployment manager 401 and an instance of a workload 402. Each of these components and their interactions with one another will now be discussed in detail.

The deployment manager 401 is implemented in a non-transitory computer-readable storage medium for execution on one or more processors of a network. Example aspects of the deployment manager 401 were discussed above with respect to the FIGS. 1 and 2.

The deployment manager 401 is configured to deploy at least the instance of the workload 402 to a target processing environment.

According to an embodiment, the deployment manager 401 is configured to include authentication and access control services in configuration data associated with the workload.

The instance of the workload 402 is implemented in a non-transitory computer-readable storage medium for execution on one or more of the processors of a network. Example aspects of the instance of the workload 402 were presented above with respect to the FIGS. 1 and 3.

The instance of the workload 402 includes a deployment policy that identifies a total number of instances of the workload for deployment over the network. The instance of the workload 402 configured to cause additional deployments of remaining instances of the workload over the network to additional target processing environments using an updated deployment policy.

According to an embodiment, each of the remaining instances decrement the total number of instances once operable in a particular additional target processing environment within the deployment policy.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:
   configuring, by a first workload, a workload with a deployment policy, an identity-based authentication mechanism, and an access-control mechanism;
   deploying, by the first workload, a first instance of the workload in a first processing environment utilizing the deployment policy, the identity-based authentication mechanism, and the access-control mechanism;
   updating, by the first workload, the deployment policy to reflect an occurrence of the first instance; and
   causing, by the first workload, the deployment of additional instances of the workload to additional processing environments using and updating the deployment policy for each additional occurrence of the workload and enforcing, by the first workload, the identity-based authentication mechanism and the access-control mechanism for the instance and the additional instances, and operating the instance and the additional instances independently but acting together as a single unit as managed by the first workload.

2. The method of claim 1, wherein configuring further includes representing the workload as an image.

3. The method of claim 1, wherein configuring further includes representing the workload as one or more configuration files.

4. The method of claim 1, wherein configuring further includes receiving a request from a principal, the request identifies a total number of instances for the workload to deploy, the total number of instances updated in the deployment policy.

5. The method of claim 1, wherein deploying the first instance further includes multicasting files or an image for the workload over a network to the first processing environment, the files or the image also multicast to the additional processing environments.

6. The method of claim 5, wherein multicasting further includes initiating multiple heads on a hard drive in the first processing environment to write the files or the image on the hard drive of the first processing environment or using solid state drives or multiple buses in the first processing environment to write the files or the image to storage in the first processing environment.

7. The method of claim 6, wherein initiating further includes starting additional multiple heads on each additional hard drive in the additional processing environments to write the files or the image on the additional hard drives of the additional processing environments.

8. The method of claim 1, wherein updating further includes, decrementing a total number of instances for the workload by one within the deployment policy to reflect the first instance being deployed in the first processing environment.

9. The method of claim 1, wherein causing further includes having the first instance from the first processing environment recursively initiate the deployment of the additional instances based on the deployment policy.

10. The method of claim 9, wherein having further includes instructing each instance to update the deployment policy to reflect successful deployment of that instance within an image or files that are used for that instance for deployment to a particular additional processing environment.

11. The method of claim 1 further comprising, sending, by the first workload, messages to each instance within each instance's processing environment to monitor each instance.

12. A method implemented in a non-transitory machine-readable storage medium and processed by one or more processors configured to perform the method, comprising:
   initiating an instance of a workload in a first processing environment as a workload image for the workload;
   authenticating, by the instance, with an external identity service;
   enforcing, by the instance, access control defined in the workload;
   decrementing a total number of instances for the workload defined in a deployment policy by one; and
   deploying a next instance of the workload when the total number of instances is non zero to a next processing environment, deployment occurs from the first processing environment to the next processing environment, and operating the instance and the next instance independently but acting together as a single unit as managed by the instance.

13. The method of claim 12, wherein initiating further includes acquiring the instance from a remote repository that uses a multicast or broadcast protocol over a network from the remote repository to the first processing environment.

14. The method of claim 12, wherein authentication further includes indirectly authenticating with the external identity service via communication by the instance with a first instance of the workload deployed over a network.

15. The method of claim 12, wherein enforcing further includes obtaining access control policies for the access control from the external identity service.

16. The method of claim 12, wherein decrementing further includes modifying the deployment policy as metadata carried with the instance.

17. The method of claim 12, wherein decrementing further includes modifying the deployment policy as metadata associated with the workload and centrally housed in a remote repository over a network.

18. A system, comprising:
   a deployment manager implemented in a non-transitory computer-readable storage medium for execution on one or more processors of a network; and
   an instance of a workload implemented in a non-transitory computer-readable storage medium and to execute on one or more of the processors;
   the deployment configured as a first workload and the deployment manager configured to deploy at least the instance to a target processing environment, and the instance including a deployment policy that identifies a total number of instances of the workload for deployment over the network, the instance configured to cause additional deployments of remaining instances of the workload over the network to additional target processing environments using an updated deployment policy, and operating the instance and the remaining instances independently but acting together as a single unit as managed by the instance.

19. The system of claim 18, wherein the deployment manager configured to include authentication and access control services in configuration data associated with the workload.

20. The system of claim 18, wherein each of the remaining instances decrement the total number of instances once operable in a particular additional target processing environment within the deployment policy.

* * * * *